Patented Feb. 19, 1924.

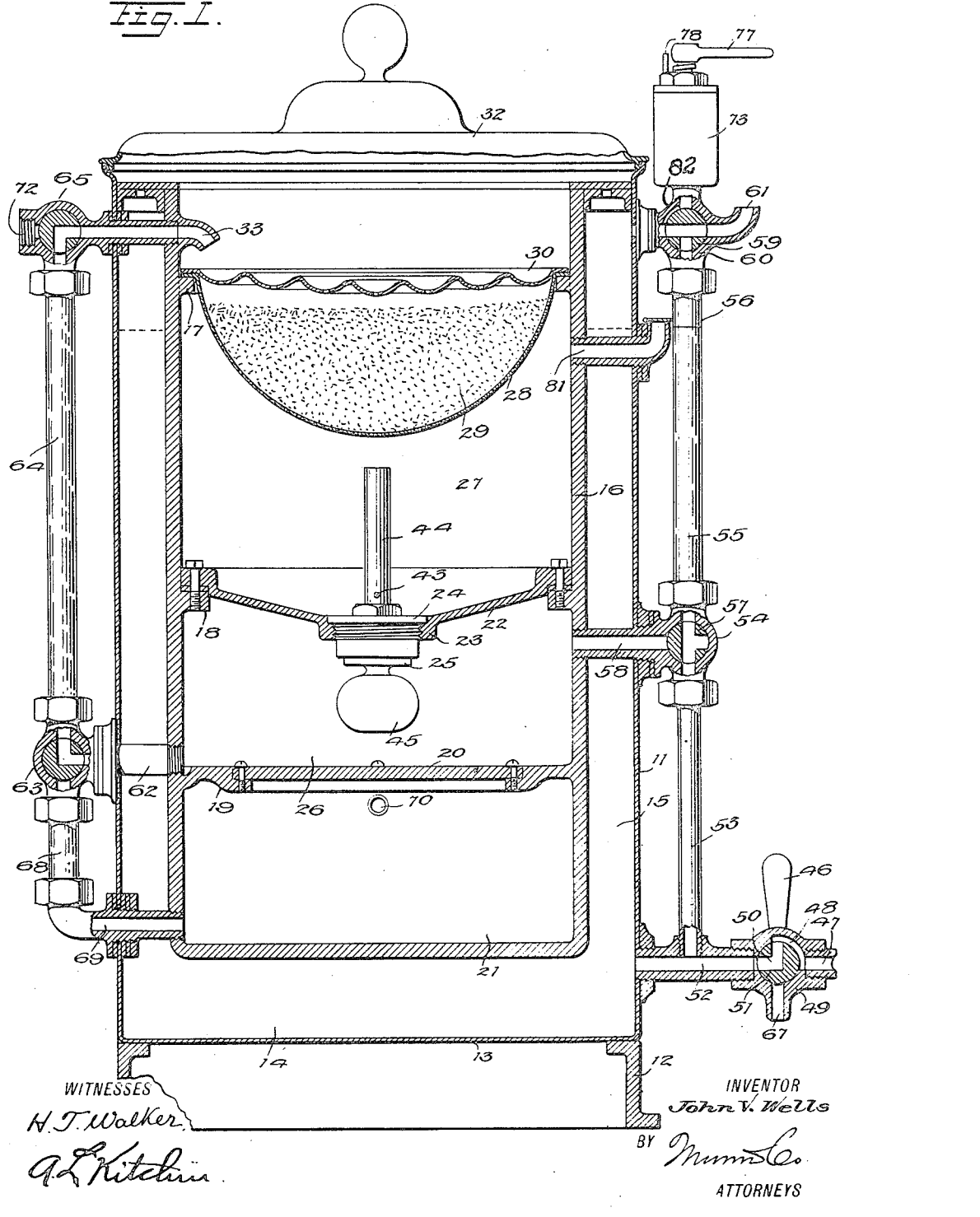

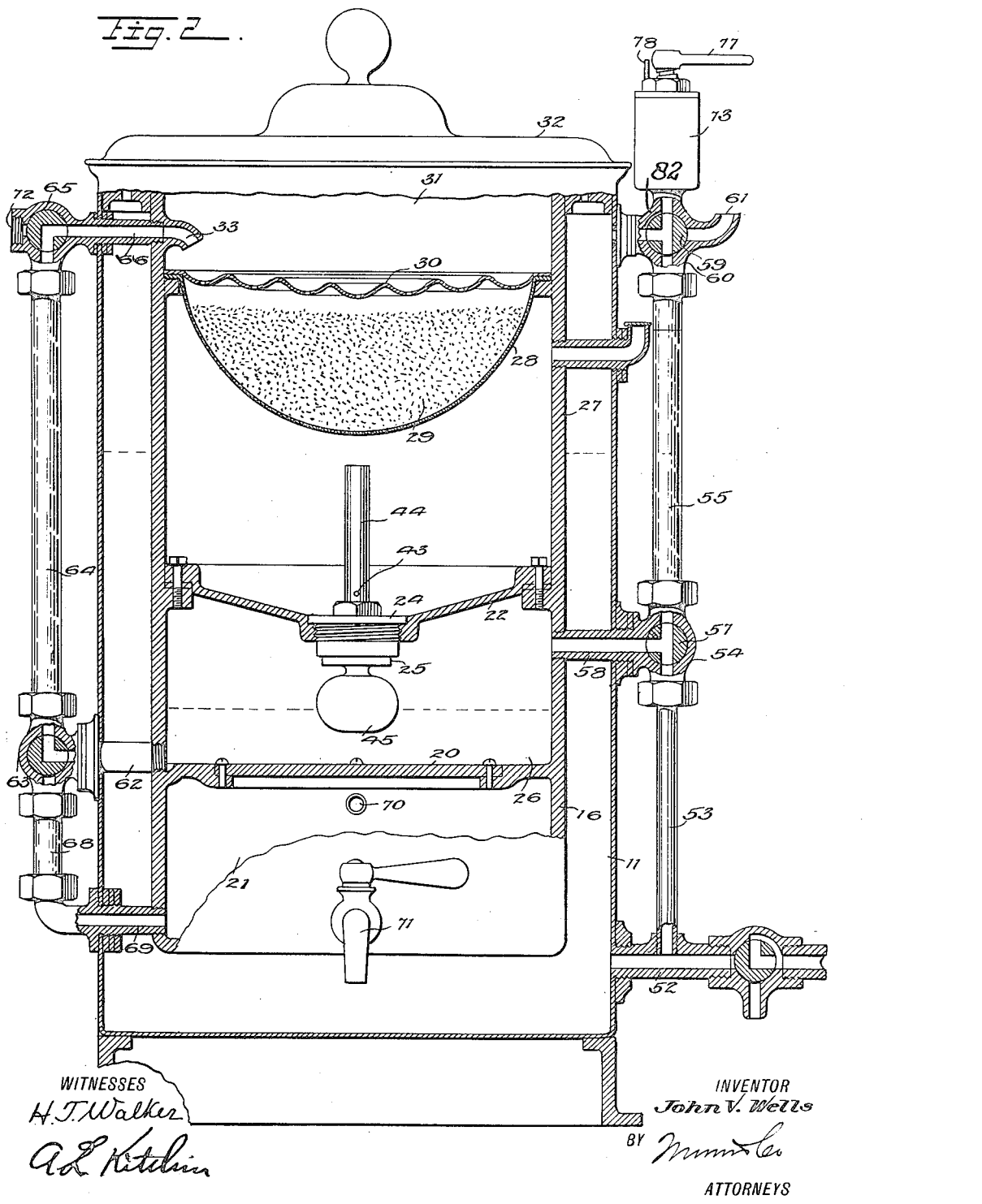

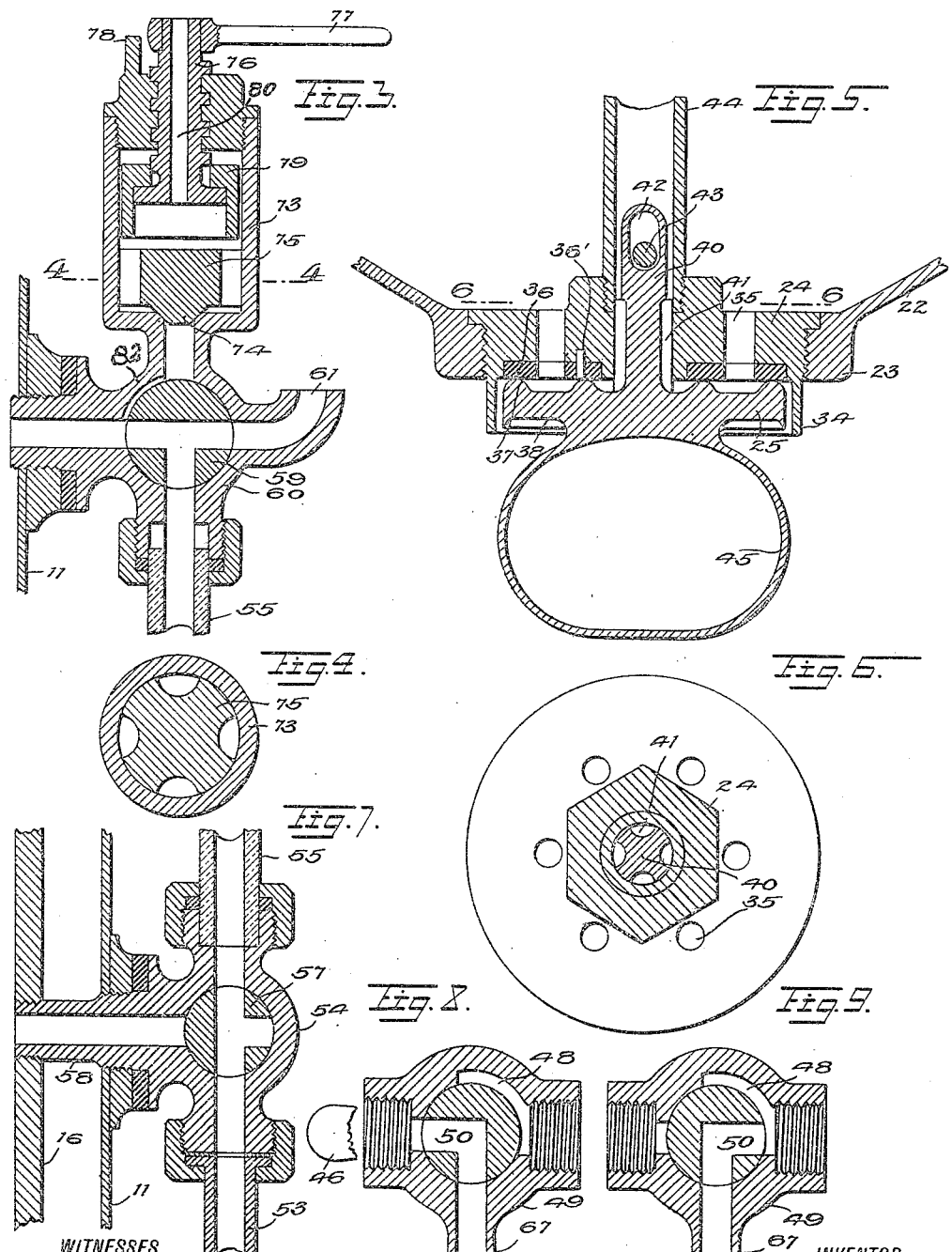

1,484,537

UNITED STATES PATENT OFFICE.

JOHN V. WELLS, OF NEW YORK, N. Y.

AUTOMATIC REPOURING COFFEE URN.

Application filed September 14, 1922. Serial No. 588,160.

*To all whom it may concern:*

Be it known that I, JOHN V. WELLS, a citizen of the United States, and a resident of the city of New York, borough of Manhattan, in the county and State of New York, have invented a new and Improved Automatic Repouring Coffee Urn, of which the following is a full, clear, and exact description.

This invention relates to coffee urns and has for an object to provide a construction wherein the percolated coffee may be repoured as often as desired.

Another object of the invention is to provide a coffee urn in which a certain quantity of water may be used and passed through the ground coffee any desired number of times.

A further object of the invention is to provide an automatically acting coffee urn which is formed with means for receiving one supply of prepared coffee while a second supply is in the course of preparation.

A still further object of the invention is to provide a coffee urn arranged so that the water may be passed through the ground coffee any desired number of times and then discharged to adjacent containers.

In the accompanying drawings—

Figure 1 is a longitudinal vertical section of a coffee urn embodying the invention.

Figure 2 is a view similar to Figure 1 but showing the valves in different positions.

Figure 3 is an enlarged sectional view through the relief valve and associated parts shown in Figure 2.

Figure 4 is a sectional view through Figure 3 approximately on line 4—4.

Figure 5 is an enlarged fragmentary sectional view showing the float valve and assoicated parts disclosed in Figures 1 and 2.

Figure 6 is a sectional view through Figure 5 approximately on line 6—6.

Figure 7 is an enlarged sectional view through one of the inlet valves shown in Figure 1.

Figure 8 is a sectional view on an enlarged scale of the cold water inlet valve shown in Figure 1, the same being in a different position from that illustrated in Figure 1.

Figure 9 is a view similar to Figure 8 but showing the valve in a third position.

Referring to the accompanying drawings by numeral, 11 indicates an outer casing of any suitable material, as for instance, sheet metal, which outer casing is preferably connected with a base 12. The base 12 is designed to be set over a stove or heater of any kind so that the bottom 13 of the casing 11 may be heated and, consequently, heat the water in the bottom chamber 14 and also the water in the annular side chamber 15 which merges into the bottom chamber.

Arranged interiorly of the casing 11 is a container 16 of any suitable material, as for instance, cast metal, said container having inwardly extending lugs 17 and flanges 18 and 19. Flange 19 is normally held closed by a plate 20 which is secured in place by suitable clamping screws. This arrangement divides the lower part of the container so as to present a lower storage chamber 21. A cone-shaped plate 22 is secured by suitable clamping screws to flange 18, said plate 22 having a threaded apertured center enlargement 23 for receiving the valve body 24 which co-acts with the valve member 25. The plate 22 divides the upper part of the container 16 into an inlet chamber 26 and a percolating chamber 27.

The lug 17 carries a foraminous receptacle 28, which receptacle is adapted to receive the ground coffee 29 and also a foraminous and corrugated distributing plate 30. These two members are preferably loosely mounted on the lug 17 and separate the percolating chamber 27 from the top or air chamber 31. A suitable lid or cover 32 is mounted on top of the casing 11 and covers the upper end of the container 16. This lid or cover may be removed at any time. The distributing plate 30 is preferably provided with annular corrugations and also with a number of perforations so that the liquid discharged from the nozzle 33 may be evenly distributed and, consequently, secure a rapid and complete extraction of the desirable qualities of the coffee.

A suitable valve mounted in the plate 22 acts to hold the coffee beverage in the chamber 27 until released as hereinafter fully described, said valve being provided with a valve seat 24 and a valve member 25, the valve seat 24 being preferably externally threaded so that it may be screwed tightly into place. The valve seat 24 is also formed with a depending annular flange or apron 34 and a plurality of apertures 35. An annular gasket 36 is imbedded in the lower surface of the valve member 24 and is provided with apertures registering with the apertures 35. This gasket is held against independent rotation by a suitable pin 36' (Figure 5).

The valve member 25 is provided with a pair of annular beads 37 and 38 adapted to press against the gasket 36 on opposite sides of the various apertures therein so as to present a substantially water-tight structure when the valve member 25 is seated. Preferably, the valve member 25 is provided with a central shaft 40 having grooves or flutes 41 through which steam is permitted to pass as hereinafter fully described. The upper end of the shaft 40 is provided with an elongated slot 42 for accommodating the pin 43 mounted in the tube 44 which tube is screwed into the center of the valve seat 24 so as to direct steam from the chamber 26 into chamber 27 and eventually out the vent 81. It will be noted that the seat 24 is provided with a central aperture or bore in which the shaft 40 reciprocates. When the valve is out of contact with the gasket 36, steam may pass through the grooves 41 into the pipe 44 as hereinafter fully described. The valve member 25 is provided with a hollow enlargement 45 which acts as a float and is adapted to cause the valve 25 to float upwardly and seat itself when a certain quantity of liquid has been inserted into the inlet chamber 26.

Associated with the casing 11 and container 16 are certain pipes and valves arranged principally exteriorly of these members and it is thought a description of these pipes and valves will be more readily understood by describing the operation of the entire device. Assuming that a quantity of ground coffee 29 has been arranged as shown in Figure 1 and it is desired to secure the usual extraction therefrom to form a coffee beverage, handle 46 is turned to the position shown in Figure 1 whereupon cold water from the water main or other supply passes from pipe 47 through the passage-way 48 in the cold water supply valve 49 and from thence to the passage-way 50 in the valve plug 51. From the passage-way 50 the water passes through the pipe 52 into the interior of casing 11 and also through the vertical pipe 53, valve 54, into a glass tube 55. Water is allowed to continually flow as just set forth until it has reached a level indicated by the line 56 in the tube 55. A similar level will be present in the casing 11.

When the device has been supplied with cold water in this manner, the burner beneath the bottom 13 is started for heating the water. It will be noted that the valve plug 57 is in the position shown in Figure 1 and therefore, shuts off the pipe 58 connecting valve 57 while the valve plug 59 of valve 60 is opened to the air. As the water becomes heated, eventually steam will be produced in the upper part of the annular chamber 15 and will begin to discharge out the nozzle 61. When this occurs, the attendant will rotate the valve plug 57 until it assumes the position shown in Figure 2. This will permit the water to pass by gravity through pipe 52, tube 53, valve 54 and pipe 58 into chamber 26 until the water has reached approximately the lower part of pipe 58. As soon as the water has been permitted to flow into the chamber 26 until the level in the chamber 25 has reached approximately the lower part of pipe 58, plug 59 of valve 60 is shifted until it assumes the position shown in Figure 2 whereupon the same will be confined in the chamber 15 and as it rises in pressure will flow into the plug 59 and from thence into the relief or blow off structure 73 and also into the glass tube 55 and from thence through valve plug 57 and pipe 58 into the upper part of chamber 26. By the time the desired or predetermined amount of water has entered chamber 26, the float 45 will have raised the valve member 25 and cause the same to seat itself against the gasket 36. Where the water has been inserted into the chamber 15 until it reaches the line 56, a maximum quantity of water will be directed into the chamber 26 which will cause the float 45 to properly seat the valve member 25. In case a less quantity than the maximum is desired, it will be necessary to use steam pressure to assist in seating the valve member 25.

After the valve 60 has been closed as above set forth, the steam pressure in chamber 15 will increase and, consequently, the steam pressure in the chamber 26 will increase until the pressure is sufficient to force the liquid in chamber 26 through the discharge or outlet pipe 62 into valve 63 and from said valve through the glass tube 64, valve 65 and pipe 66 into the discharge outlet 33 and from thence onto the distributing plate 30. The water will continue to flow in this path until substantially all of the water has been discharged from the chamber 26. It will be evident that the steam pressure in chamber 26 will hold the valve member 25 closed as the water level lowers. However, as soon as the same has forced all of the water from the chamber 26 and also all of the water out of the tube 64 and associated parts, said steam will escape into the chamber 31 and thereby relieve the pressure in chamber 26 so that the valve member 25 will automatically drop by its own weight and by the pressure of the coffee beverage in chamber 27. The steam in the chamber 35 may escape through members 28 and 30 into chamber 27 and out vent 81 or if the lid 32 is not fitting tightly, it may escape around the lid.

As soon as the steam pressure has decreased sufficiently to release the valve member 25, the coffee beverage will quickly flow under the action of gravity into the chamber 26. The steam in the chamber at this time will pass upwardly through the grooves or flutes 41 into the tube 44 and be discharged above the coffee beverage into chamber 27 from which chamber the steam may escape through vent 81.

As soon as the coffee beverage has passed in this manner into the inlet chamber 26, the float 45 will again seat the valve member 25 and steam from the chamber 15 will build up pressure in the upper part of the chamber 26 and cause the liquid to be again forced through pipe 62 and parts connected therewith to the distributing plate 30. This action is repeated automatically as often as desired so that the liquid is poured once or any desired number of times on the distributing plate 30 and caused to pass once or any desired number of times through the ground coffee 29. When the liquid has passed the desired number of times through the ground coffee, valve 54 is turned to the position shown in Figure 1 and valve 60 is turned to the position also shown in Figure 1 whereupon the steam may escape from chamber 15 into the atmosphere through the nozzle 61.

It will be evident that when the desired quantity of water has passed through the cold water valve 49, said valve is turned until the flow of water is stopped and is prevented from either flowing into the pipe 52 or the discharge nozzle 67. When the cold water valve 59 is in the position shown in Figure 1, cold water is passing into the chamber 14, when it is in the position shown in Figure 8, hot water is passing from pipe 47 outwardly through the nozzle 67. After the valves 54 and 60 have been re-adjusted to the position shown in Figure 1, valve 63 is turned until the pipe 62 is in free communication with the glass tube 68 whereupon the coffee beverage will pass under the action of gravity downwardly through the pipe 69 into the storage chamber 21. A suitable vent pipe 70 permits the air to escape from this chamber as the coffee beverage enters. The coffee beverage may be drawn from this chamber from time to time through a suitable spigot 71.

In case it should be desired to make or secure the coffee beverage and supply the same to suitable containers or urns associated with that shown in Figure 1, said containers or urns could be connected by suitable pipes to the socket 72 forming part of the valve 65 and the coffee beverage forced into the associated containers by turning the valve 65 so that there will be a passage-way from the glass tube 64 to the socket 72 and to said valve 63 as shown in Figure 1.

When the parts are set as just described, steam pressure from the pipe 64 would force the percolated coffee or coffee beverage through the valve 65 and socket 72 to the desired discharge point. In this way, the restaurant or eating house may provide several containers but only one percolating coffee urn and this coffee urn may be caused to supply from time to time coffee beverage to the various containers as well as to the storage chamber 21.

As indicated in Figure 3, there is provided a relief or blow off structure 73 which is provided with a valve member 74 formed with an enlargement 75 acting as a weight for keeping the valve member closed. When the parts are arranged as shown in Figure 3 and the valve plug 59 turned to the position shown in Figure 2, the same pressure is acting directly on the valve member 74 and will raise the same in case the pressure is greater than the weight of the valve and its enlargement 75. When the valve member 74 is raised, steam will escape past the valve member and out through a suitable vent 80. In case it is desired to secure a higher pressure than could be secured by the use of the valve member 74 alone, the threaded sleeve 76 is rotated by a handle 77 until it strikes the stop 78 whereupon the auxiliary weight 79 will be lowered and will rest on the enlargement 75 and in this way add its weight to this enlargement so that the pressure must rise sufficiently to raise both of these weights before it can escape past valve 74. Sometimes this additional weight is desired where the percolated coffee or coffee beverage is to be forced through the sockets 72 to a distant point or where the quantity of coffee beverage is less than the required amount to float the valve member 25 to its seat. When this is the case extra pressure of steam is necessary to blow the valve member 25 to its seat before the steam can force the liquid from chamber 26. The purpose of the by-pass 82 is to prevent the rise of pressure in the boiler above the combined weight of the valves 75 and 79, in case the key 59 in the valve 60, should by any cause, blank the port to the boiler.

What I claim is:—

1. An automatic repouring coffee urn, comprising a container divided into an upper and lower compartment, the division member for dividing the container being formed with an aperture, a valve seat positioned in said aperture and a valve member for closing said seat, said valve member being provided with a float adapted to cause the valve member to seat when the lower compartment has received a predetermined quantity of liquid, tubular means extending from the bottom of said lower compartment to a point above the upper compartment, foraminous means carrying ground coffee arranged in said upper compartment, and means for forcing water and steam into said lower compartment whereby the liquid in said lower compartment will be intermittently forced therefrom and discharged into the means carrying said ground coffee.

2. An automatic repouring coffee urn, comprising a container, a division member for dividing the container into upper and lower compartments, said division member being provided with a valve so as to control the passage of liquid from the upper compartment to the lower compartment, a float adapted to close said valve when the lower compartment is provided with a predetermined quantity of liquid, foraminous means carried in the upper compartment adapted to support ground coffee, tubular means connecting the lower part of the lower compartment with the upper part of the upper compartment so that liquid may be forced from the lower compartment and discharge into the upper part of the upper compartment and thereby be caused to pass through said foraminous means and any ground coffee carried thereby, a casing surrounding said container and spaced therefrom, means for directing water into said casing, tubular means in communication with the space between the casing and the container and also with the lower part, and a pipe extending from said tubular means substantially centrally thereof into the upper part of said lower compartment whereby when the water in said casing is heated the steam generated therein will force water into said lower compartment until the level of the water in the casing is substantially in the same horizontal plane as said pipe, the entrance of the water into said lower compartment acting on said float for seating said valve, said water in said lower compartment being forced therefrom by steam passing from said casing into the upper part of said lower compartment, said water passing through said lower compartment to the upper part of the upper compartment.

3. In an automatic repouring coffee urn of the character described, a container having a division plate for dividing the container into upper and lower compartments, said division member having a central aperture, a valve seat arranged in said central aperture provided with an opening, a valve member associated with said valve seat, and a float connected with said valve member for causing the same to engage said seat when a predetermined quantity of liquid has entered said lower compartment.

4. In an automatic repouring coffee urn of the character described, a container, a division plate for dividing the container into upper and lower compartments, said division plate being formed substantially as an inverted cone with an aperture in the center, a valve seat positioned on the said aperture and provided with a plurality of openings extending therethrough, one of said openings being positioned centrally, a tube fitted into said central opening and extending upwardly into the upper compartment, a valve member co-acting with said seat, said valve member being provided with a shaft having a slot, said shaft extending into said tube, a pin extending through part of the tube and into said slot for limiting the reciprocatory movement of the valve member, and a float for moving said valve member toward said seat.

5. In an automatic repouring coffee urn of the character described, a container, a plate for dividing the container into upper and lower compartments, a valve arranged in said plate for controlling the communication between the upper and lower compartments, and a float connected with said valve adapted to close the valve when a predetermined level of liquid has been inserted into said lower compartment.

6. In an automatic repouring coffee urn of the character described, a container, means for dividing the same into two compartments, a valve controlling the flow of liquid from one compartment to the other, a foraminous receptacle arranged in the upper compartment for receiving ground coffee, a distributing plate positioned on top of said foraminous plate, said distributing plate having a plurality of corrugations, said distributing plate being perforated, and means for directing liquid to the upper surface of said distributing plate.

7. In an automatic repouring coffee urn of the character described, a container provided with upper and lower compartments, a storage compartment arranged below said lower compartment, means for directing liquid from said lower compartment into said storage compartment, means for directing liquid from said lower compartment to a distant point, and means for directing steam into the upper part of said lower compartment for causing the liquid in the lower compartment to pass therefrom.

8. An automatic repouring coffee urn, comprising a container, a division member for dividing said container into upper and lower chambers, means for supporting ground coffee in said upper chamber, tubular members extending through the center of said division member from the upper chamber to the lower chamber, means outside of said container forming a passageway between the upper part of said upper chamber and the lower part of said lower chamber, and means for forcing liquid from the lower chamber through said passageway to the upper part of said upper chamber and above the means for supporting ground coffee.

JOHN V. WELLS.